United States Patent [19]

Nebelung

[11] Patent Number: 4,695,307

[45] Date of Patent: Sep. 22, 1987

[54] BAFFLE MOVING MECHANISM FOR USE IN A GLASSWARE MANUFACTURING MACHINE OF THE INDIVIDUAL SECTION TYPE

[75] Inventor: Hermann H. Nebelung, Zurich, Switzerland

[73] Assignee: Emhart Industries, Inc., Farmington, Conn.

[21] Appl. No.: 887,145

[22] Filed: Jul. 17, 1986

[30] Foreign Application Priority Data

Jul. 24, 1985 [GB] United Kingdom ................. 8518717

[51] Int. Cl.⁴ ............................................ C03B 9/335
[52] U.S. Cl. ...................... 65/242; 65/233; 65/234; 65/307
[58] Field of Search ................ 65/171, 172, 173, 233, 65/234, 239, 242, 307, 260

[56] References Cited

U.S. PATENT DOCUMENTS

| | | | |
|---|---|---|---|
| 3,383,193 | 5/1968 | Bailey | 65/307 X |
| 3,401,029 | 9/1968 | Roberts | 65/260 |
| 4,613,353 | 9/1986 | Voisine | 65/163 |

FOREIGN PATENT DOCUMENTS 2134510  8/1984  United Kingdom ................. 65/260

Primary Examiner—Arthur Kellogg
Attorney, Agent, or Firm—H. Samuel Kieser

[57] ABSTRACT

A moving mechanism for moving a baffle (16), funnel or blowhead. A support (14) for the member is pivotally mounted on a first horizontal axis (20) on an arm (18) which is mounted to turn about a second horizontal axis (22) to move the member between operative and out-of-the-way positions. Driving means (24) is operable to turn the arm about the second horizontal axis and orientation means (42) maintains the member in a constant orientation during movement of the arm.

2 Claims, 3 Drawing Figures

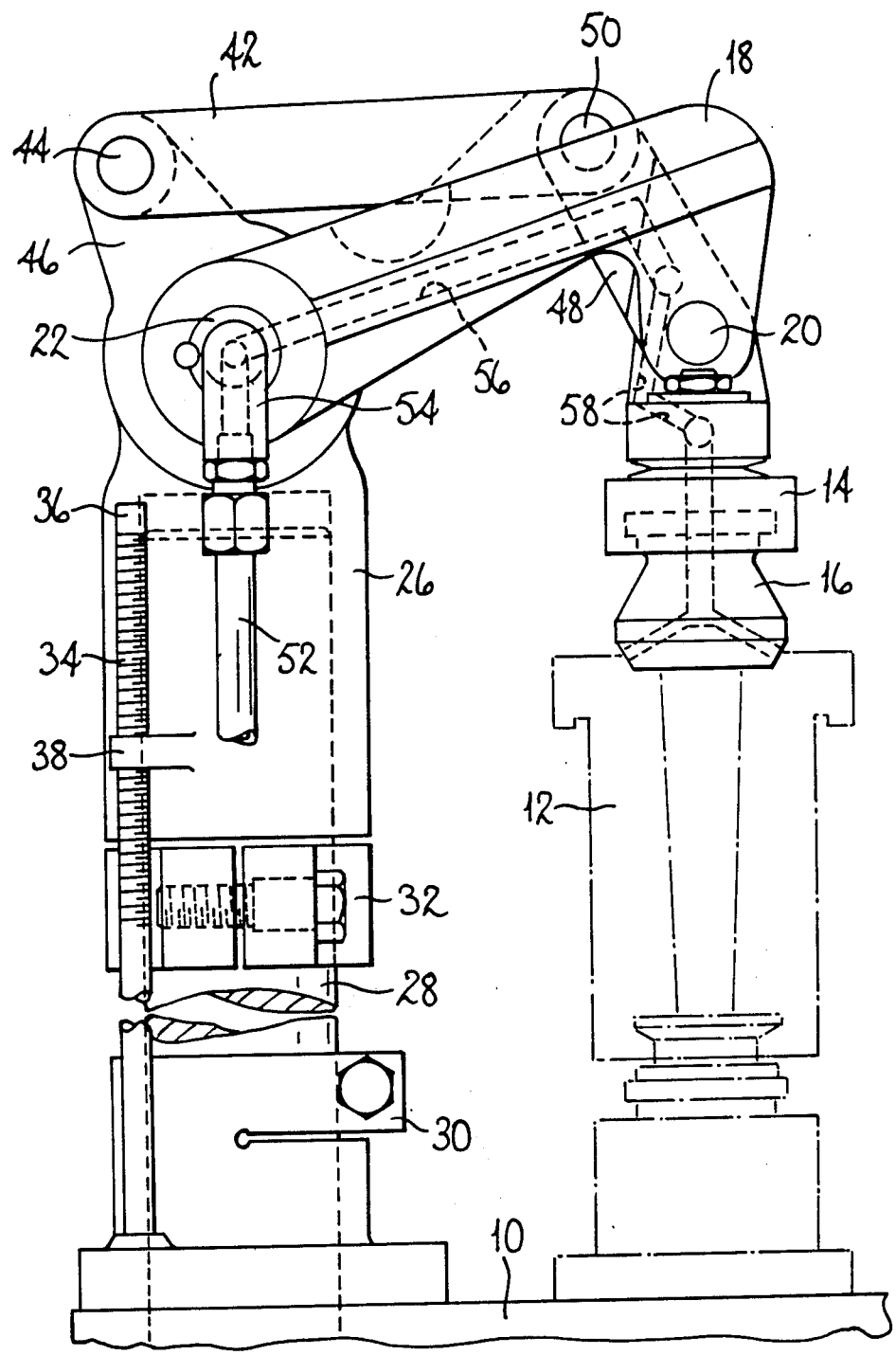
Fig_1

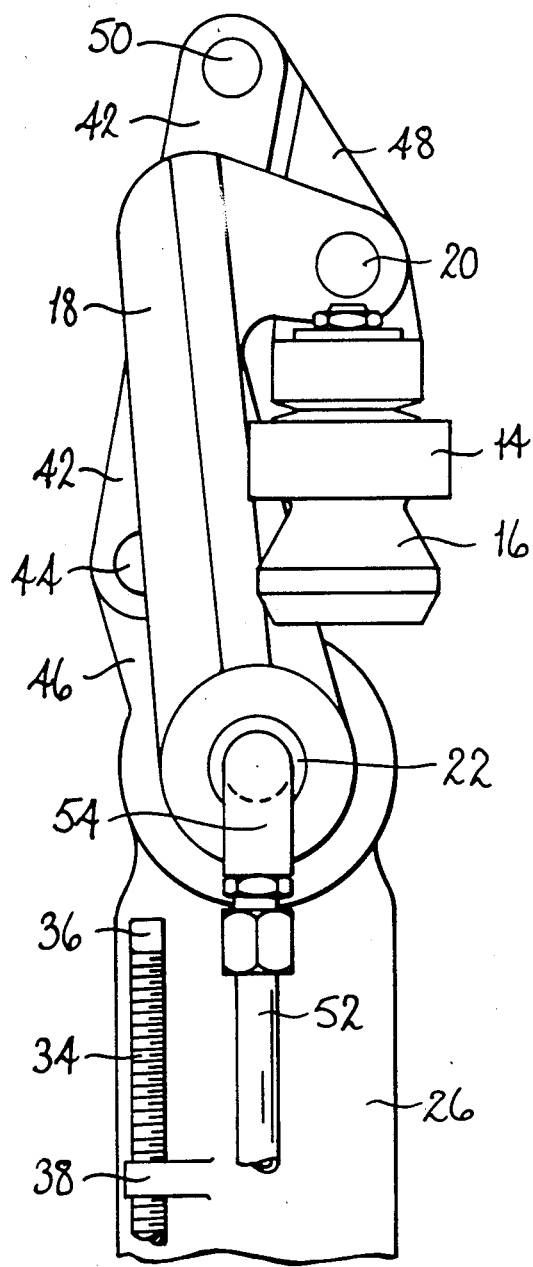
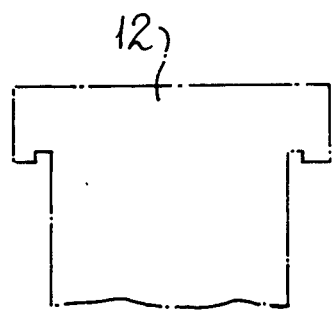
Fig_2

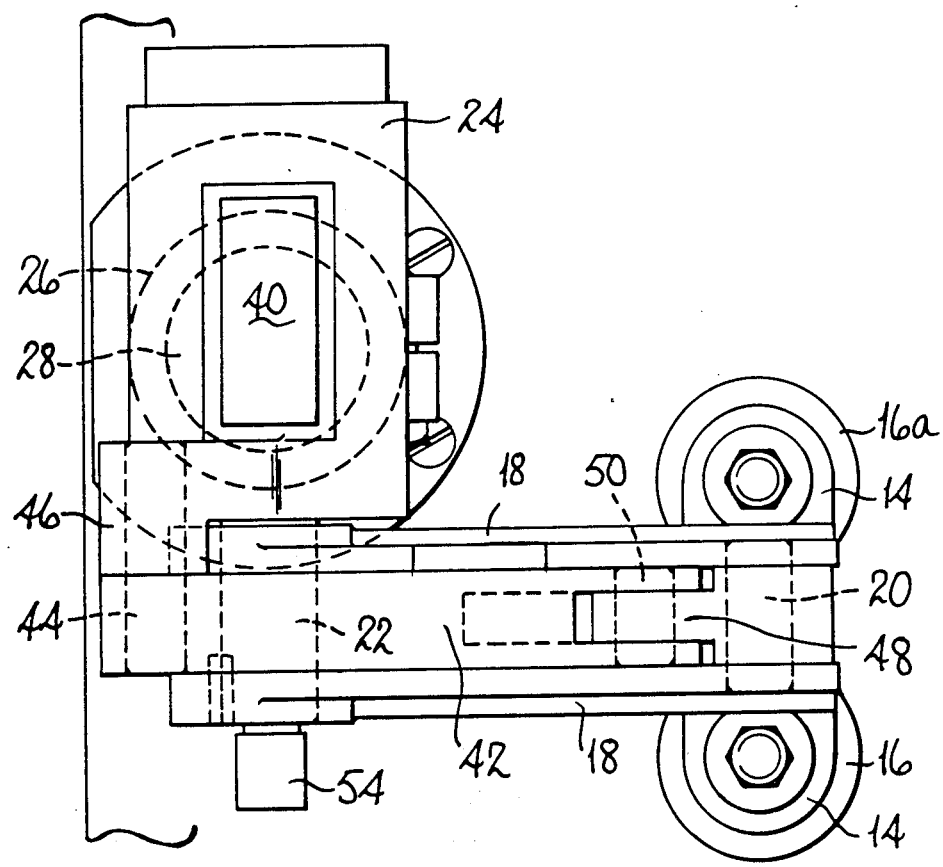
Fig_3

BAFFLE MOVING MECHANISM FOR USE IN A GLASSWARE MANUFACTURING MACHINE OF THE INDIVIDUAL SECTION TYPE

BACKGROUND OF THE INVENTION

This invention is concerned with a moving mechanism for use in a glassware manufacturing machine of the individual section type for moving an operative member between an operative position above a mould of the machine and an out-of-the-way position.

Glassware manufacturing machines of the individual section type are well known and comprise a number of individual glass moulding units, or sections, arranged side by side. Each section comprises at least one blank mould to which a gob of molten glass is supplied to be moulded into a parison and at least one blow mould to which parisons moulded in the blank mould are transferred to be blown into articles of glassware. Machines of the individual section type can operate either in a blow-blow operation in which the gobs are blown into parisons and the parisons are then blown or in a press-blow operation in which the gobs are pressed into parisons and the parisons are then blown. In a blow-blow operation, a funnel is positioned in an operative position on top of the balnk mould to guide the gob into the blank mould. When the gob has entered the blank mould, a baffle is positioned in an operative position thereof on top of the funnel and air is blown through the baffle into the mould to force the glass downwards in the mould into contact with a plunger located at the bottom of the blank mould. Next, the baffle is removed from the funnel and the funnel is removed to an out-of-the-way position thereof. The baffle is now positioned in an operative position thereof of top of the mould in which the baffle closes the top of the mould and the plunger is withdrawn from the glass leaving a space into which air is blown to cause the glass to take up the shape of the mould. Thus, a parison is created. The baffle is now moved to an out-of-the-way position thereof and the parison is transferred to a blow mould. When the parison is in the blow mould, a blowhead is moved into an operative position thereof on top of the mould so that air can be blown from the blowhead into the parison to cause it to expand to the shape of the mould thereby creating an article of glassware. The blowhead is then removed to an out-of-the-way position thereof and the completed article removed from the section. In a press-blow operation, a funnel is used to guide a gob into the blank mould and is then removed to its out-of-the-way position. A baffle is then moved into an operative position on top of the blank mould and a plunger is moved into the blank mould from below to press the glass against the mould to form it into a parison. The baffle is then removed to its out-of-the-way position and the parison transferred to a blow mould in which a blowing operation similar to that of a blow-blow operation takes place.

As can be seen from the descriptions above of the blow-blow and press-blow operations of an individual section type machine, such a machine comprises a moving mechanism for moving a funnel between an operative position above a blank mould of the machine and an out-of-the-way position thereof, a moving mechanism for moving a baffle between an operative position above a blank mould of the machine, possibly a further operative position on top of a funnel on a blank mould of the machine, and an out-of-the-way position, and a moving mechanism for moving a blowhead between an operative position above a blow mould of the machine and an out-of-the-way position. This invention is concerend with such moving mechanisms.

In a conventional glassware forming machine of the individual section type, the moving mechanisms for the funnel, baffle and blowhead are similar. Each comprises a vertically-disposed piston and cylinder assembly having a first piston rod extending upwardly therefrom and a second piston rod extending downwardly therefrom. An arm is fixed to the first piston rod and extends horizontally therefrom providing a support for the operative member, i.e. a funnel, a baffle or a blowhead. A cam follower is mounted on the second piston rod to engage a cam track which causes the piston and piston rods to be turned about a vertical axis as the piston moves up or down the cylinder. Thus, operation of the piston and cylinder causes the first piston rod to be moved vertically while turning about a vertical axis. The operative member is, therefore, moved in a path which has a vertical component and a rotary component about a vertical axis. The end portion of the cam track is arranged to be vertical so that when this part of the cam track is reached the motion is entirely vertical. When the piston is at an upper end of the cylinder, the operative member is at an out-of-the-way position thereof above and out of alignment with its associated mould. As the piston is moved towards the bottom of the cylinder, the operative member is moved downwardly and also turned into alignment with its associated mould and finally moves vertically into its operative position as the cam enters the vertical part of the cam track.

The conventional moving mechanisms described above have the disadvantage that considerable space is required for the swinging motion of the operative member in a horizontal plane, and as is common practice, when two, three or even four operative members are mounted side by side on the same support, this problem is more serious. The provision of sufficient space for the swivelling motion of the operative member is particularly difficult as it is not permissible to allow the operative member to encrouch above an adjacent section of the machine. Furthermore, the conventional moving mechanisms involve a relatively complex combination of cam and piston and cylinder assembly which is subject to wear. The problem of providing sufficient space for the swivel of the operative member has been addressed in U.S. Pat. No. 3,586,494 by the provision of complex linkage means for turning the support for the operative members as the operative members are moved to their out-of-the-way positions so as to reduce the space required. However, the arrangement described in this U.S. patent specification still requires an undesirable amount of space in a horizontal plane and retains the undesirable combination of piston and cylinder and cam arrangement.

It is an object of the present invention to provide a moving mechanism for use in a glassware manufacturing machine of the individual section type for moving an operative member between an operative position above a mould of the machine and out-of-the-way position in which the space in a horizontal plane required for the movement is reduced and the use of a cam arrangement is avoided.

BRIEF DESCRIPTION OF THE INVENTION

The invention provides a moving mechanism for use in a glassware manufacturing machine of the individual section type for moving an operative member between an operative position above a mould of the machine and an out-of-the-way position, the mechanism comprising a support for the operative member, an arm on which the support is pivotally mounted on a first horizontal axis, the arm being mounted to turn about a second horizontal axis to bring an operative member supported by the support to its operative and out-of-the-way positions, driving means operable to turn the arm in one direction about the second horizontal axis to bring the member to its operative position and to turn the arm in the opposite direction about the second horizontal axis to bring the member to its out-of-the-way position, and orientation means operable to maintain the support and a member supported thereby in a constant orientation during the turning movement of the arm.

In a moving mechanism as set out in the last preceding paragraph, the operative member moves in a vertical plane about the second axis so that the horizontal space required for the movement is minimised. Furthermore, the motion required is simple, being motion about an axis only, so that the use of complex cam arrangements is avoided.

Conveniently, in the operative position, the first and second axes are at substantially the same height and, in the out-of-the-way position, the first axis is at a higher height than the second axis.

Where the moving mechanism is used in a machine which is carrying out a blow-blow operation and the operative member is a baffle whose operative position is on top of a blank mould of the machine and which has a further operative position on top of a funnel on the blank mould, the drive means may be operable to turn the arm to bring the baffle to its further operative position, the first axis being higher than the second axis when the baffle is in its further operative position by substantially the same amount as it is lower than the second axis when the baffle is in its operative position. In this way, the vertical centre line of the baffle is aligned with the vertical centre line of the mould in both the operative and further operative positions.

The orientation means may conveniently comprise a link pivotally mounted on a third, fixed, horizontal axis and pivotally connected to an upward extension of the support, the pivotal connection being on a fourth horizontal axis, the first, second, third and fourth axes being arranged at the corners of a parallelogram. Thus, during motion of the arm about the second axis, the link serves to maintain the support, and hence the operative member, in a vertical orientation.

The driving means of the moving mechanism may conveniently comprise a rotary hydraulic motor which is suitably compact. For example, the rotary hydraulic motor may comprise a cylinder and a piston slidable within the cylinder on the introduction of hydraulic fluid under pressure into the cylinder, the cylinder and the piston making a screw-threaded connection with one another so that the piston is caused to turn about a central axis of the cylinder as it moves along the cylinder. An even more compact arrangement can be achieved if a drive shaft of the motor makes a screw-threaded connection with the piston of opposite hand to the connection between the piston and the cylinder so that the drive shaft rotates twice as fast as the piston.

In order to enable the operative position of the operative member to be adjusted, height adjusting means may be provided for moving the mechanism heightwise to adjust the height of the operative position.

Since it is necessary to supply air to a blowhead and air to a baffle which is being used in a blow-blow operation, air under pressure may be supplied to the operative member through passages in the arm and the support, the air being supplied to the arm through a rotating union on the second axis.

BRIEF DESCRIPTION OF THE DRAWINGS

There now follows a detailed description, to be read with reference to the accompanying drawings of a moving mechanism for use in a glassware manufacturing machine of the individual section type which is illustrative of the invention. It is to be understood that the illustrative moving mechanism has been selected for description by way of example and not of limitation of the invention.

In the drawings:

FIG. 1 is a side elevational view of the illustrative moving mechanism, showing an operative member supported thereby in an operative position thereof;

FIG. 2 is a view similar to FIG. 1 of an upper portion of the illustrative moving mechanism but showing the operative member in an out-of-the-way position thereof; and FIG. 3 is a plan view of the illustrative mechanism showing the operative member in its operative position.

DETAILED DESCRIPTION OF PREFERRED EMBODIMENT OF THE INVENTION

The illustrative moving mechanism is for use in a glassware manufacturing machine of the individual section type for moving a baffle between an operative position above a mould of the machine and an out-of-the-way position. However, it is to be understood that similar moving mechanisms can be used for moving a funnel or a blowhead of the machine. The illustrative moving mechanism is described in relation to moving a baffle in a press-blow operation of the machine.

FIG. 1 shows a horizontal plate 10 of a frame of the machine on which is mounted a blank mould 12 of conventional construction having two side portions which co-operate in forming a parison-moulding cavity. The illustrative moving mechanism comprises a support 14 for the baffle 16, the baffle 16 fitting into the support 14 in a bayonet-type fitting as is conventional. The mechanism also comprises an arm 18 on which the support 14 is pivotally mounted on a first horizontal axis 20 provided by a pin. The arm 18 has a left hand and a right hand portion (see FIG. 3) extending parallel to one another and the pin which forms the axis 20 extends between these portions of the arm 18. The support 14 is arranged to support a further baffle 16a (See FIG. 3) which is arranged to co-operate with a further blank mould (not shown), the baffles 16 and 16a being arranged on opposite sides of the arm 18.

The arm 18 is mounted to turn about a second horizontal axis 22 to bring the baffle 16 supported by the support 14 to its operative position (shown in FIG. 1) and to its out-of-the-way position (shown in FIG. 2). The arm 18 is generally L-shaped in side elevational view having, when the baffle is in its operational position, an extended portion extending directly away from the axis 22 and a depending portion on which the pin 20 is supported.

The axis 22 of the illustrative moving mechanism is defined by an output shaft of a rotary hydraulic motor 24 of the illustrative mechanism. The motor 24 forms driving means operable to turn the arm 18 in one direction about the second horizontal axis 22 to bring the baffle 16 to its operative position, the motion being clockwise (viewing FIG. 1) and to turn the arm 18 in the opposite direction about the axis 22 to bring the baffle 16 to its out-of-the-way position. The motor 24 is mounted on top of a sleeve 26 in which a support column 28 is received. The support column 28 extends vertically upwards from the plate 10 of the frame of the machine and is clamped thereto by a clamp 30. The sleeve 26 includes a clamp 32 for clamping the sleeve to the column 28 to determine the height of the motor 24 and hence of the axis 22. Height adjusting means is provided for moving the mechanism heightwise on the column 28 to adjust the height of the operative position of the baffle 16. This height adjusting means comprises a screw threaded shaft 34 which extends vertically upwards from the plate 10 and is turnable about a vertical axis by applying a suitable tool to a square upper end portion 36 of the shaft 34. The shaft 34 makes a threaded connection with a projection 38 of the column 26 so that turning the shaft 34 causes the sleeve 26 to move vertically sliding on the column 28. Once the operative position of the baffle 16 has been adjusted by turning the shaft 34, the clamp 32 is operated to clamp the sleeve 26 against further motion vertically.

The motor 24 comprises a horizontally arranged cylinder with a piston (not shown) movable therein. The piston makes a screw-threaded connection with the cylinder so that when hydraulic fluid under pressure is introduced into the cylinder, being controlled by a valve 40 mounted on top of the cylinder, the piston moves along the cylinder and turns about a horizontal axis as it does so. The drive shaft which defines the axis 22 makes a screw-threaded connection with the piston of opposite hand to the connection between the piston and the cylinder so that, when the piston turns, the drive shaft turns but twice as much. To move the baffle 16 from its operative position (shown in FIG. 1) to its out-of-the-way position (shown in FIG. 2) the motor 24 turns its output shaft through a little less than 90° anti-clockwise (viewing FIGS. 1 or 2) and to move the baffle 16 back to its operative position the rotation is reversed. From FIG. 1, it can be seen that in the operative position of the baffle 16, the first 20 and second 22 axes are at substantially the same height whereas, from FIG. 2, it can be seen that in the out-of-the-way position of the baffle 16 the axis 20 is at a higher height than the axis 22.

The illustrative moving mechanism also comprises orientation means operable to maintain the support 14 and the baffle 16 supported thereby in a constant orientation during turning movement of the arm 18 about the axis 22. Specifically, the orientation means act to maintain the support 14 and baffle 16 in vertical alignment with the baffle 16 directly below the axis 20. This acts to increase the compactness of the motion so that the motion of the arm 18 required to remove the baffle 16 from alignment with the mould 12 is less than it would be if the orientation means were not present. Furthermore, it ensures that the baffle 16 is in a vertical orientation in its operative position. The orientation means comprises a link 42 which is pivotally mounted on a third, fixed, horizontal axis 44 which is provided on an upwardly extending bracket 46 of the sleeve 26. The axis 44 is fixed in relation to the sleeve 26 and hence to the axis 22. The axis 44 is, of course, movable upwardly with the sleeve 26 when the height adjustment means is operated. The link 42 is arranged between the two portions of the arm 18 and is also pivotally connected to an upward extension 48 of the support 14, the pivotal connection being on a fourth 50 horizontal axis. The first 20, second 22, third 44 and fourth 50 axes are arranged at the corners of a parallelogram as can be seen from FIGS. 1 and 2 so that during motion of the arm about the axis 22 a line joining the axes 20 and 50 remains parallel to a line joining the axes 22 and 44.

Although in the press-blow operation, no supply of air to the baffle 16 is required. FIG. 1 shows how air under pressure can be supplied to the operative member through passages in the arm 18 and the support 14. The necessity for such a supply of air occurs when a baffle is used in a blow-blow operation and is necessary when the operative member is a blowhead. The air under pressure is supplied through a vertical pipe 52 to a rotating union 54 which is on the second axis 22 from the rotating union 54 the air passes into a passage 56 in the arm 18 which communicates with the baffle 16 through passages 58 in the support 14.

The illustrative moving mechanism could be used in a blow-blow operation. In this case, the baffle 16 has an operative position on top of the blank mould of the machine and a further operative position on top of a funnel on the blank mould. In this case, the motor 24 is operable to turn the arm 18 to bring the baffle to its further operative position in which the first axis 20 is at a higher height than the axis 22 and is also operable to bring the baffle to its operative position by turning the arm to a position in which the axis 20 is below the axis 22 by a height substantially equal to the amount that it was above the axis 22 in its further operative position.

I claim:

1. A glassware manufacturing machine of the individual section type comprising:
   a mold,
   a baffle,
   parallelogram linkage means for supporting said baffle and for displacing said baffle from an operative to a remote position without changing its orientation, said parallelogram linkage means including
   first conduit means for directing air under pressure to said baffle,
   said baffle including second conduit means continuously communicating with said first conduit means.

2. A glassware forming machine according to claim 1, wherein said baffle is a blowhead.

* * * * *